US012002447B2

(12) United States Patent
McCutcheon

(10) Patent No.: US 12,002,447 B2
(45) Date of Patent: Jun. 4, 2024

(54) NOISE CANCELLATION SYSTEM AND SIGNAL PROCESSING METHOD FOR AN EAR-MOUNTABLE PLAYBACK DEVICE

(71) Applicant: ams AG, Premstätten (AT)

(72) Inventor: Peter McCutcheon, Goring (GB)

(73) Assignee: AMS AG, Premstätten (AT)

( * ) Notice: Subject to any disclaimer, the term of this patent is extended or adjusted under 35 U.S.C. 154(b) by 253 days.

(21) Appl. No.: 17/780,733

(22) PCT Filed: Nov. 18, 2020

(86) PCT No.: PCT/EP2020/082480
§ 371 (c)(1),
(2) Date: May 27, 2022

(87) PCT Pub. No.: WO2021/104957
PCT Pub. Date: Jun. 3, 2021

(65) Prior Publication Data

US 2022/0415300 A1 Dec. 29, 2022

(30) Foreign Application Priority Data

Nov. 28, 2019 (EP) .................................... 19212145

(51) Int. Cl.
*G10K 11/178* (2006.01)

(52) U.S. Cl.
CPC .. *G10K 11/17854* (2018.01); *G10K 11/17881* (2018.01)

(58) Field of Classification Search
CPC ....... G10K 11/17854; G10K 11/17879; G10K 11/17881; G10K 2210/1081; H04R 1/1008; H04R 1/1083
See application file for complete search history.

(56) References Cited

U.S. PATENT DOCUMENTS 4,494,074 A 1/1985 Bose
5,138,664 A 8/1992 Kimura et al.
(Continued)

FOREIGN PATENT DOCUMENTS

EP 3451327 3/2019
EP 3486896 5/2019

OTHER PUBLICATIONS

Elliot, S., "Signal Processing for Active Control", Academic Press, 2001, 23 pages.
(Continued)

*Primary Examiner* — Jason R Kurr
(74) *Attorney, Agent, or Firm* — MH2 TECHNOLOGY LAW GROUP LLP

(57) ABSTRACT

A noise cancellation system for an ear-mountable playback device having a speaker, a feedforward microphone and an error microphone comprises a filter chain for coupling the feedforward microphone to the speaker, the filter chain comprising a series connection or parallel connection of a coarse filter and a fine filter, and a noise control processor. The fine filter is formed of a set of sub-filters having a predefined frequency range, wherein the predefined frequency range of each of the sub-filters together forms an effective overall frequency range of the fine filter. The noise control processor is configured to calculate an error signal based on a first noise signal sensed by the feedforward microphone and on a second noise signal sensed by the error microphone, to perform an adaptation of coarse filter parameters of the coarse filter based on the error signal, and to perform a limited adaptation of fine filter parameters of each of the sub-filters based on the error signal, wherein limits of the limited adaptation comprise the predefined frequency ranges of the sub-filters and at least one of a gain limit and a Q factor limit.

17 Claims, 5 Drawing Sheets

(56) References Cited

U.S. PATENT DOCUMENTS

| | | | |
|---|---|---|---|
| 5,652,799 A | 7/1997 | Ross et al. | |
| 8,693,700 B2 | 4/2014 | Bakalos et al. | |
| 9,076,431 B2 | 7/2015 | Kamath et al. | |
| 10,565,979 B1 * | 2/2020 | Christian | G10K 11/17883 |
| 2011/0007907 A1 | 1/2011 | Park et al. | |
| 2011/0293103 A1 | 12/2011 | Park et al. | |
| 2012/0057720 A1 | 3/2012 | Van Leest | |
| 2012/0170766 A1 | 7/2012 | Alves et al. | |
| 2017/0162184 A1 | 6/2017 | Christoph | |
| 2019/0266991 A1 * | 8/2019 | Hayashi | H04R 1/1083 |

OTHER PUBLICATIONS

Bristow-Johnson, "Cookbook formulae for audio equalizer biquad filter coefficients", <https://www.musicdsp.org/en/latest/Filters/197-rbj-audio-eq-cookbook.html?highlight=cookbook>, May 4, 2005, 7 pages.

Breccia, Luca(EP Examiner), Extended European Search Report in corresponding EP Application No. 19212145.7 mailed on Jun. 4, 2020, 12 pages.

Breccia, Luca (EP Authorized Officer), International Search Report and Written Opinion in corresponding International Application No. PCT/EP2020/082480 mailed on Feb. 16, 2021, 15 pages.

* cited by examiner

NOISE CANCELLATION SYSTEM AND SIGNAL PROCESSING METHOD FOR AN EAR-MOUNTABLE PLAYBACK DEVICE

CROSS-REFERENCE TO RELATED APPLICATIONS

The present application is the national stage entry of International Patent Application No. PCT/EP2020/082480, filed on Nov. 18, 2020, and published as WO 2021/104957 A1 on Jun. 3, 2021, which claims the benefit of priority of European Patent Application No. 19212145.7, filed on Nov. 28, 2019, all of which are incorporated by reference herein in their entireties.

FIELD OF THE INVENTION

The present disclosure relates to a noise cancellation system and to a signal processing method, each for an ear-mountable playback device, e.g. a headphone, comprising a speaker, a feedforward microphone and an error microphone.

BACKGROUND OF THE INVENTION

Nowadays a significant number of headphones, including earphones, are equipped with noise cancellation techniques. For example, such noise cancellation techniques are referred to as active noise cancellation or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones.

FF and FB ANC is achieved by tuning a filter based on given acoustics of a system.

In conventional ANC systems, filter parameters of respective ANC filters are e.g. tuned during production of an ANC headphone, for example with a calibration measurement, or by continuously adapting all filter parameters during operation of the ANC headphone.

An objective to be achieved is to provide an improved concept for improving ANC performance in a feedforward part of an ANC system.

This objective is achieved with the subject matter of the independent claims. Embodiments and developments of the improved concept are defined in the dependent claims.

SUMMARY OF THE INVENTION

In various implementations, a noise cancelling headphone as a general example for ear-mountable playback devices with ANC comprises a driver or speaker with a front face directly acoustically coupled to a front volume, which is made up in part by the ear canal volume when the headphone is worn. The rear face of the driver may be enclosed by a rear volume. There is usually a front vent that acoustically couples the front volume to the ambient environment, and a rear vent that acoustically couples the rear volume to the ambient environment. Either vents may be covered with an acoustically resistive mesh.

ANC headphones can have a microphone on the outer shell directly coupled to the ambient environment that detects a negligible quantity of the driver signal. This microphone's signal is processed via a feedforward filter and the signal is played out of the driver creating an anti-noise signal that is largely opposite in phase and equal in amplitude to with the noise signal at the ear, thereby implementing FF ANC. An attenuation achieved is typically about 20 dB across a frequency band from 100 Hz to 1 kHz.

The noise at the ear can be represented by the ambient to ear acoustic transfer function, AE, and the anti-noise signal can be given by the ambient to the FF microphone acoustic transfer function AFFM, the FF filter response F and the driver to ear acoustic transfer function DE, such that an residual error Err results, e.g.

$$Err=AE-AFFM\cdot F\cdot DE.$$

For perfect noise cancellation, the error Err=0, so the ideal filter shape F is given by:

$$F=\frac{-AE}{AFFM.DE}$$

The ideal filter shape can be calculated with the measurements of the three transfer functions as described above. This is commonly referred to as the FF target. Therefore, if the filter differs from the FF target, then noise cancellation is reduced. The aim for good FF ANC is to match the filter, F to the FF target as well as possible.

ANC headphones may also have a microphone mounted in close proximity to the driver which detects sound from the ambient environment and the driver itself.

For an FF system to achieve 20 dB ANC, the filter should match the FF target to a high level of accuracy. It has been found that, if the filter phase has a perfect match, the filter amplitude must match within 0.8 dB or, if the filter amplitude has a perfect match, the filter phase must be within 5 degrees.

The improved concept is based on the finding that this represents a challenge for a fixed FF filter because the FF target response can change based on, inter alia:

- variable acoustic leakages from the front volume to the ambient environment due to how the headphone is worn each time it is placed on a head,
- differences in the ambient noise response at the ear due to variable compressions of an ear cushion or rubber tip,
- component differences resulting in varied driver and microphone responses,
- differences due to manufacture causing varied propagation of noise through the headphone.

These changes can be very small, but stop the FF ANC achieving better than 20 dB, even with a calibration process.

A typical FF target contains several highly damped and difficult to characterise resonances based on the driver response and its acoustic load and the propagation of sound through the headphones into the ear. These resonances are prone to change based on the points above. Therefore a fixed FF filter cannot compensate for these, even if it has a very high order, as it will only be appropriate for one headphone unit, when worn in a specific way by the same person. This means that any small changes to the FF target and the FF filter would no longer be optimal.

Thus, there is a need to account for these small changes in the FF target response, and this process must account for change based on manufacturing differences between units, and the continually subtle changing FF target when placed on the head differently. As the FF target changes so frequently, an adaptive filter is required.

However, conventional adaptive ANC exists but has drawbacks particularly for infinite impulse response, IIR, filters of higher orders, which are required to reduce processing overheads in noise cancellation ICs. Conventional adaptive algorithms adapt coefficients in IIR filters which risk going unstable and can have coefficients effectively competing with each other risking false nulls and a very slow, or high power adaption which is impractical for noise cancellation headphone ICs.

Accordingly, the improved concept is based on the idea of an adaption process of a two-stage filter chain. The first stage is an adaption of a coarse filter which compensates for large changes in FF Target, and the second is a fine adaption to adapt an additional high resolution filter or fine filter arranged in series or parallel to the coarse filter and that is severely constrained to have a small effect on the overall filter chain. The fine filter has the effect of refining the overall filter response to reduce the gain and phase error between the filter and the acoustics to increase the FF ANC up to 40 dB or more in the bandwidth already dictated by the driver and processor speed.

For example, the fine filter is formed of a set of sub-filters, each of the sub-filters having a predefined frequency range. The predefined frequency range of each of the sub-filters may be adjacent to or at least partially overlap with the predefined frequency range of at least one other sub-filter of the set of sub-filters. The sub-filters may be connected serially or in parallel.

Hence an effective overall frequency range can be achieved with the fine filter being a continuous frequency range. For example, the effective frequency range is chosen to have an optimum effect of refining the filter response of the filter chain.

Only a limited adaptation of filter parameters of each of the sub-filters is performed according to the improved concept, wherein limits of the limited adaption comprise the predefined frequency ranges of the sub-filters and at least one of a gain limit and a Q factor limit. Such limits may not directly be on the frequency gains or Q factors, but they could be directly on the poles/zeros of the sub-filters or their coefficients, such that they have the effect of indirectly limiting the frequency, gain or Q factor.

For example, an implementation of a noise cancellation system for an ear-mountable playback device according to the improved concept is provided. The ear-mountable playback device has a speaker, a feedforward microphone configured to predominantly sense ambient sound, and an error microphone configured to sense ambient sound and sound being output from the speaker. The noise cancellation system comprises the filter chain for coupling the feedforward microphone to the speaker, the filter chain comprising a series connection or parallel connection of the coarse filter and the fine filter. The noise cancellation system further comprises a noise control processor, which is configured to calculate an error signal based on a first noise signal sensed by the feedforward microphone and on a second noise signal sensed by the error microphone. The noise control processor is further configured to perform an adaption, e.g. a coarse adaptation, of coarse filter parameters of the coarse filter based on the error signal and to perform a limited adaption of fine filter parameters of each of the sub-filters based on the error signal, wherein limits of the limited adaption comprise the predefined frequency ranges of the sub-filters and at least one of a gain limit and a Q factor limit.

For example, at least one of the sub-filters is a biquad filter or a second order IIR filter. In some implementations, all sub-filters are implemented the same way. Biquad filters or other second order IIR filters can be implemented in a signal processor with little effort. Furthermore, such filters can be parameterized with five or six filter parameters each, which reduces the effort during adaption in terms of calculation effort and stability tracking. In particular, limiting the parameters in the course of the limited adaptation can reduce the effort in terms of calculations needed during adaption.

In some implementations, the set of sub-filters comprises between six and twelve sub-filters, e.g. between eight and ten sub-filters. For example, given a limited overall frequency range of the fine filter, this allows to have small predefined frequency ranges for the sub-filters, resulting in a high resolution for refining the overall filter response of the filter chain.

For example, an effective overall frequency range of the fine filter is from 80 Hz to 2000 Hz, e.g. from 80 Hz to 1000 Hz. Such frequency ranges have been found to have a good impact on the overall frequency response of the filter chain.

Limiting the gain of each sub-filter achieves less exposure to stability issues; similarly, limiting a Q factor of the sub-filter results in limited variations of the shape of the respective filter response and also can be used to support stability of the sub-filter during the adaption process. For example, both a gain limit and the Q factor limit are applied in addition to the limit of the predefined frequency range.

For example, each sub-filter is one of a peak filter and a notch filter. For example, during an adaption process, one specific sub-filter can change from a peak filter to a notch filter and vice versa by way of the adaption process. If the sub-filter results in a peak filter, the overall gain in the predefined frequency range can be increased, while it can be attenuated if the sub-filter results in a notch filter.

As mentioned before, the calculated and/or measured target response function F, which does not consider variations during operation, is the basis for the coarse filter of the filter chain, which may also include non-minimum phase portions. In other words, it can be assumed that there is no substantial delay required for the fine filter, as this is compensated for by the coarse filter. Hence, it may be sufficient if each sub-filter is a minimum phase filter.

In various implementations, the limited adaption of the sub-filters is based on an error minimization algorithm, e.g. a least-mean-squares, LMS, algorithm. For example, a filtered-u LMS algorithm can be used to adapt the fine filter parameters of the sub-filters.

In various implementations, the limited adaption of the sub-filters comprises an adaption of a gain, a center frequency and a Q factor of at least one of the sub-filters. Hence, the fine filter parameters of the respective sub-filter can be calculated from the adapted gain, center frequency and Q factor.

In addition or as an alternative, the limited adaption of the sub-filters may comprise directly adapting the fine filter parameters of at least one of the sub-filters and checking the limits of the limited adaption for the adapted fine filter parameters. Each of the implementations allows an efficient adaption process.

As mentioned above, the coarse filter may have an initial state that is tuned to match a golden reference headphone to achieve about 20 dB or more noise cancellation. For each individual headphone, this coarse filter may be calibrated to match in the best possible way to compensate for component and manufacturing tolerances.

Depending on the headphone fit, the coarse filter will adapt to achieve about 20 dB ANC. This adaption can be relatively simple, e.g. an adaption of a gain and/or of a low pass filter cut-off frequency of the coarse filter employing the noise control processor. The main coarse changes due to variation in fit may be a leakage between the ear cushion and the user's head, which can cause a large portion of noise to enter the ear via this low acoustic impedance path, rather than via the headphone vents and housing. This substantially changes the driver response of the headphone and ultimately a low pass characteristic of the AE part relative to the AFFM part of the FF Target. In most headphone examples, changing the coarse filter gain and low pass characteristics can provide a substantially better amplitude and phase match.

In various implementations of the system, the noise control processor is configured to perform the coarse adaptation in advance of the limited adaptation, and/or during the limited adaptation at a slower rate compared to the limited adaptation. The adaptive fine filter then only needs to make small changes. These small changes are typically not smooth. This means that the fine filter is likely to adapt to have a "bumpy" amplitude and phase response. To match these bumps, it is likely that a relatively high order filter is used, as mentioned above.

For conventional adaption for ANC, fully adapting coefficients would be complex, time consuming and risk falling into false nulls for a high order filter. Therefore the adaption process according to the improved concept is simplified by placing constraints on the adaptive fine filter, i.e. within the limited adaptation.

The fine filter or the sub-filters of the fine filter do not require large gain or phase differences, so the adaption may be constrained or limited within a certain range defined in a tuning or factory calibration stage, or defined by the coarse filter parameters.

The error signal calculated from the first and the second noise signal may represent a normalized measure of the residual ambient noise at the ear, e.g. by calculating a ratio between the residual noise at the ear and the ambient noise as measured by the feedforward microphone, a measure of noise cancellation performance can be achieved. However, other ways of calculation are not excluded. This can be used to steer the adaptive algorithm.

A noise cancellation system according to one of the implementations described above can be used in an ear-mountable playback device, e.g. a headphone or handset. Accordingly, an ear-mountable playback device comprises a noise cancellation system as described above, the speaker, the feedforward microphone and the error microphone located in proximity to the speaker.

In other implementations, a noise cancellation system according to one of the implementations described above can be comprised by an audio player. For example, the audio player is supplied with the respective microphone signals from a headphone or the like and provides the respective speaker signal for the headphone.

According to another embodiment following the improved concept, a signal processing method for an ear-mountable playback device having a speaker, a feedforward microphone configured to predominantly sense ambient sound, and an error microphone configured to sense ambient sound and sound being output from the speaker is provided. The feedforward microphone is coupled to the speaker via a filter chain comprising a series connection of a coarse filter and a fine filter. The fine filter is formed of a set of sub-filters, each of the sub-filters having a predefined frequency range, and the predefined frequency range of each of the sub-filters at least partially overlapping with the predefined frequency range of at least one other sub-filter of the set of sub-filters. The method comprises calculating an error signal based on a first noise signal sensed by the feedforward microphone and on a second noise signal sensed by the error microphone. The method further comprises performing a coarse adaption of coarse filter parameters of the coarse filter based on the error signal and performing a limited adaption of fine filter parameters of each of the sub-filters based on the error signal. Therein limits of the limited adaption comprise the predefined frequency ranges of the sub-filters and at least one of a gain limit and a Q factor limit.

Further implementations of the method become readily apparent to the skilled person from the various implementations described above of the noise cancellation system.

The method may be implemented in hardware or software, e.g. employing a signal processor, e.g. a noise control processor as described above.

In all of the embodiments described above, ANC can be performed both with digital and/or analog filters. All of the audio systems may include feedback ANC as well. In such implementations, e.g. the system further comprises a feedback noise filter coupling the error microphone to the speaker. Processing and recording of the various signals is preferably performed in the digital domain.

BRIEF DESCRIPTION OF THE DRAWINGS

The improved concept will be described in more detail in the following with the aid of drawings. Elements having the same or similar function bear the same reference numerals throughout the drawings. Hence their description is not necessarily repeated in following drawings.

In the drawings.

DETAILED DESCRIPTION

Figure 1:
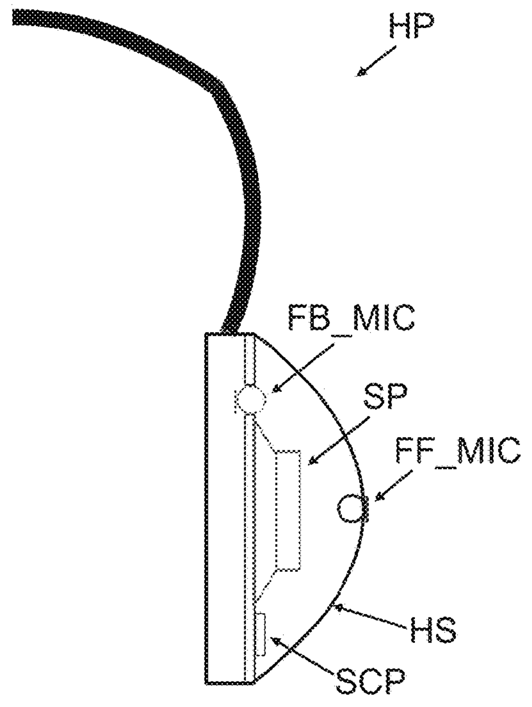
FIG. 1 shows a schematic view of a headphone.

FIG. 1 shows a schematic view of an ANC enabled playback device in the form of a headphone HP that in this example is designed as an over-ear or circumaural headphone. Only a portion of the headphone HP is shown, corresponding to a single audio channel. However, extension to a stereo headphone will be apparent to the skilled reader for this and the following disclosure. The headphone HP comprises a housing HS carrying a speaker SP, a feedback noise microphone or error microphone FB_MIC and an ambient noise microphone or feedforward microphone FF_MIC. The error microphone FB_MIC is particularly directed or arranged such that it records both sound played over the speaker SP and ambient noise. Preferably the error microphone FB_MIC is arranged in close proximity to the speaker, for example close to an edge of the speaker SP or to the speaker's membrane, such that the speaker sound may be the predominant source for recording. The ambient noise/feedforward microphone FF_MIC is particularly directed or arranged such that it mainly records ambient noise from outside the headphone HP. Still, negligible portions of the speaker sound may reach the microphone FF_MIC.

In the embodiment of FIG. 1, a noise control processor SCP is located within the headphone HP for performing various kinds of signal processing operations, examples of which will be described within the disclosure below. The noise control processor SCP may also be placed outside the headphone HP, e.g. in an external device located in a mobile handset or phone or within a cable of the headphone HP.

Figure 2:
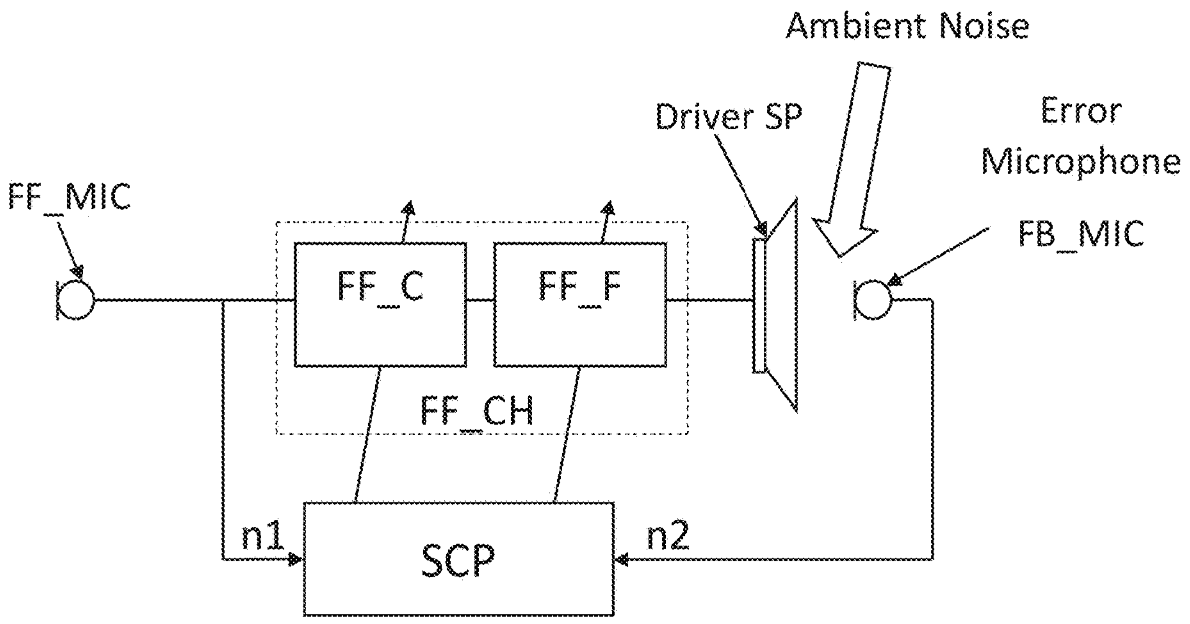
FIG. 2 shows a block diagram of an example adaptive ANC system.

FIG. 2 shows a block diagram of an example adaptive ANC system. The system comprises the error microphone FB_MIC and the feedforward microphone FF_MIC, both providing their output signals to the noise control processor SCP. A first noise signal n1 recorded with the feedforward microphone FF_MIC is further provided to a feedforward filter chain FF_CH for generating an anti-noise signal being output via the speaker SP. The filter chain FF_CH comprises a series connection of a coarse filter FF_C and a fine filter FF_F, which are both adaptable by the noise control processor SCP.

At the error microphone FB_MIC, the sound being output from the speaker SP combines with ambient noise and is recorded as a second noise signal n2 that includes the remaining portion of the ambient noise after ANC. The first and the second noise signals n1, n2 are used by the noise control processor SCP for calculating an error signal, which is then used for adjusting a filter response of the feedforward filter chain FF_CH, in particular by adjusting the coarse filter FF_C and the fine filter FF_F separately.

Figure 3:
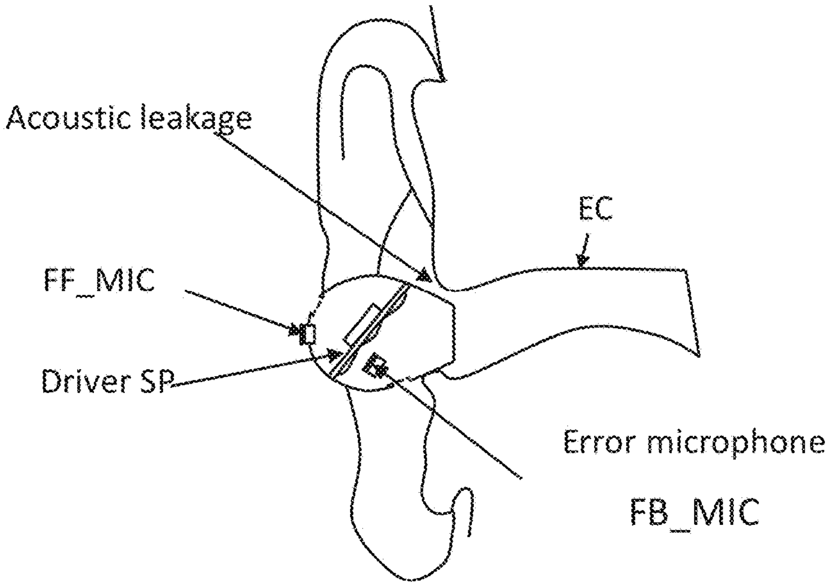
FIG. 3 shows an example representation of a "leaky" type earphone.

FIG. 3 shows an example representation of a "leaky" type earphone, i.e. an earphone featuring some acoustic leakage between the ambient environment and the ear canal EC. In particular, a sound path between the ambient environment and the ear canal EC exists, denoted as "acoustic leakage" in the drawing.

Figure 4:
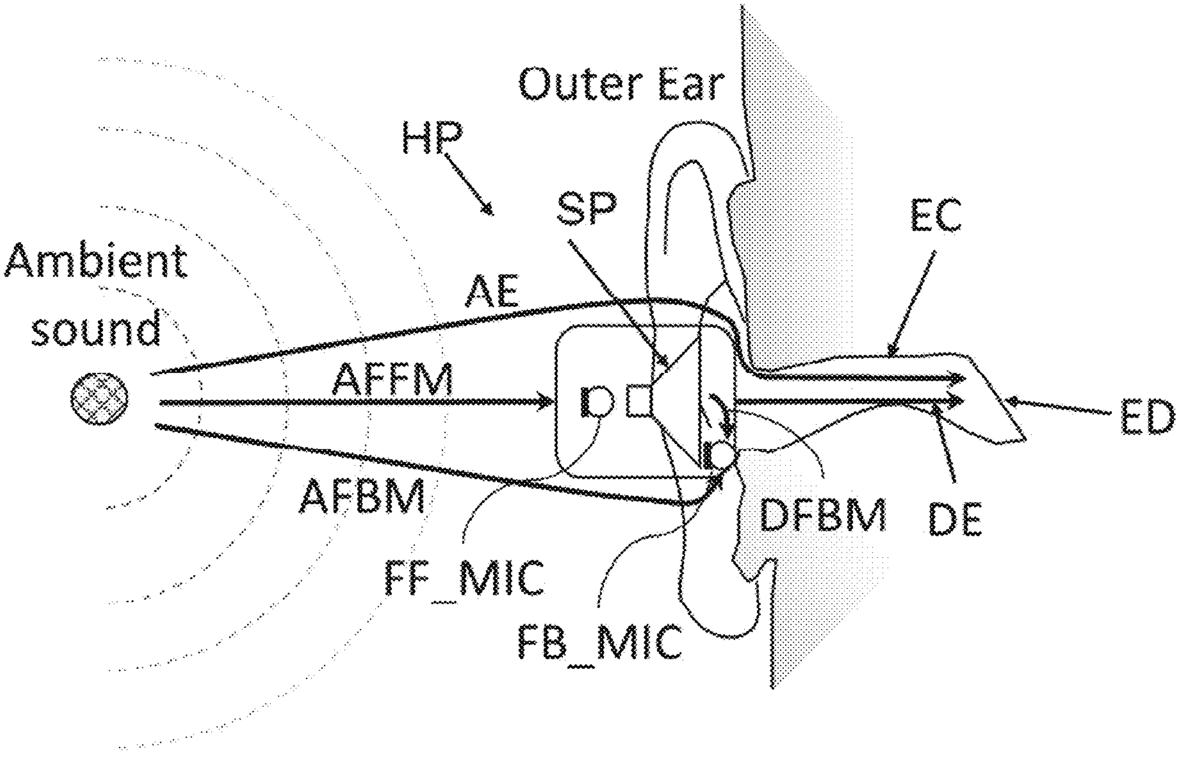
FIG. 4 shows an example headphone worn by a user with several sound paths from an ambient sound source.

FIG. 4 shows an example configuration of a headphone HP worn by a user with several sound paths. The headphone HP shown in FIG. 4 stands as an example for any ear-mountable playback device of a noise cancellation enabled audio system and can e.g. include in-ear headphones or earphones, on-ear headphones or over-ear headphones. Instead of a headphone, the ear-mountable playback device could also be a mobile phone or a similar device.

The headphone HP in this example features a loudspeaker SP, a feedback noise microphone FB_MIC and a feedforward microphone FF_MIC, which e.g. is designed as a feedforward noise cancellation microphone. Internal processing details of the headphone HP are not shown here for reasons of better overview.

For example, the headphone HP has a front volume which is directly acoustically coupled to the ear canal volume of a user, the driver or speaker SP which faces into the front volume and a rear volume which surrounds the rear face of the driver SP. The rear volume may have a vent with an acoustic resistor to allow some pressure relief from the rear of the driver SP. The front volume may also have a vent with an acoustic resistor to allow some pressure relief at the front of the driver SP. An ear cushion may surround the front face of the driver SP and makes up part of the front volume.

In normal operation the headphone is placed on a user's head such that a complete or partial seal is made between the ear cushion and the user's head, thereby at least in part acoustically coupling the front volume to the ear canal volume.

In the configuration shown in FIG. 4, several sound paths exist, each of which can be represented by a respective acoustic response function or acoustic transfer function. For example, a first acoustic transfer function DFBM represents a sound path between the speaker SP and the feedback noise microphone FB_MIC, and may be called a driver-to-feedback response function. The first acoustic transfer function DFBM may include the response of the speaker SP itself. A second acoustic transfer function DE represents the acoustic sound path between the headphone's speaker SP, potentially including the response of the speaker SP itself, and a user's eardrum ED being exposed to the speaker SP, and may be called a driver-to-ear response function. A third acoustic transfer function AE represents the acoustic sound path between the ambient sound source and the eardrum ED through the user's ear canal EC, and may be called an ambient-to-ear response function. A fourth acoustic transfer function AFBM represents the acoustic sound path between the ambient sound source and the feedback noise microphone FB_MIC, and may be called an ambient-to-feedback response function.

A fifth acoustic transfer function AFFM represents the acoustic sound path between the ambient sound source and the feedforward microphone FF_MIC, and may be called an ambient-to-feedforward response function.

Response functions or transfer functions of the headphone HP, in particular between the microphones FB_MIC and FF_MIC and the speaker SP, can be used with a feedback filter function B and feedforward filter function F, which may be parameterized as noise cancellation filters during operation.

The headphone HP as an example of the ear-mountable playback device may be embodied with both the microphones FB_MIC and FF_MIC being active or enabled such that hybrid ANC can be performed, or as an FF ANC device, where only the feedforward microphone FF_MIC is active and the error or feedback noise microphone FB_MIC is not active for FB ANC purposes.

Any processing of the microphone signals or any signal transmission are left out in FIG. 4 for reasons of better overview. However, processing of the microphone signals in order to perform ANC may be implemented in a processor located within the headphone or other ear-mountable playback device or externally from the headphone in a dedicated processing unit. The processor or processing unit may be called a noise control processor. If the processing unit is integrated into the playback device, the playback device itself may form a noise cancellation enabled audio system. If processing is performed externally, the external device or processor together with the playback device may form the noise cancellation enabled audio system. For example, processing may be performed in a mobile device like a mobile phone or a mobile audio player, to which the headphone is connected with or without wires.

Figure 5:
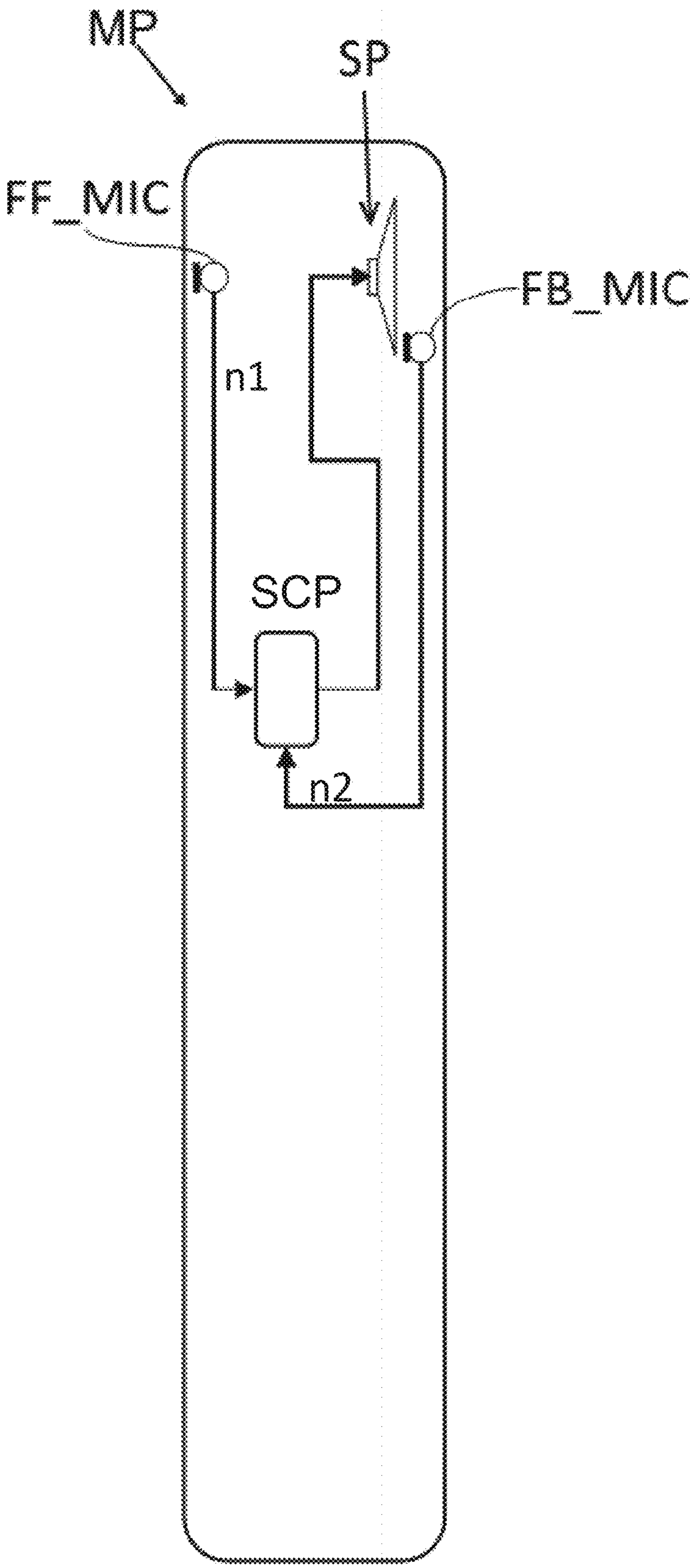
FIG. 5 shows an example representation of an ANC enabled handset.

Referring now to FIG. 5, another example of a noise cancellation enabled audio system is presented. In this example implementation, the system is formed by a mobile device like a mobile phone MP that includes the playback device with speaker SP, error microphone FB_MIC, ambient noise or feedforward microphone FF_MIC and a noise control processor SCP for performing inter alia ANC and/or other signal processing during operation.

In a further implementation, not shown, a headphone HP, e.g. like that shown in FIG. 1 or FIG. 4, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

In the following, several implementations of the improved concept will be described in conjunction with specific use cases. It should however be apparent to the skilled person that details described for one implementation may still be applied to one or more of the other implementations.

Referring back to FIG. 2, the signal from the FF microphone FF_MIC is passed through the filter chain FF_CH formed by the coarse adaptive filter FF_C and through a constrained, high resolution adaptive fine filter FF_F.

The coarse filter FF_C can be made up of a number of biquads or second order IIR filters, which are seeded by matching the acoustic transfer function $$F = \frac{-AE}{AFFM.DE}.$$

For example, the coarse filter FF_C may be formed of 4 to 10 of such second order IIR filters, e.g. 6 to 8. The matching of the coarse adaptive filter FF_C to the acoustic transfer function is such that after adaption, its amplitude error is e.g. less than 1 dB and its phase error is less than 8 degrees in a designated FF ANC bandwidth.

The coarse filter may be adapted conventionally by adapting coefficients of the filter, or it may be adapted by adapting several parameters such as the gain and a low pass cut-off frequency. These parameters can then be converted into coefficients and written to the filter. The coarse filter could be adapted by implementing ams application EP 17189001.5, whereby a resultant coarse filter response is created by the interpolation of two or more parallel filters. In particular, the noise control processor SCP may be configured to interpolate between a high leak and a low leak filter depending on a leakage condition as detailed in the mentioned ams application.

Figure 6:
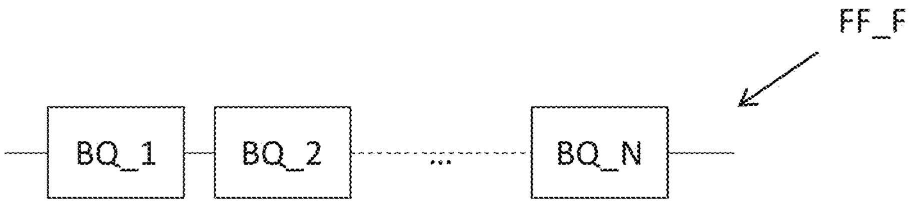
FIG. 6 shows an example implementation of a fine filter according to the improved concept.

Referring now to FIG. 6, a possible implementation of the fine filter FF_F is shown. The fine filter FF_F is formed of a set of sub-filters, which e.g. are connected serially. Each of the sub-filters BQ_1, BQ_2, . . . , BQ_N has a predefined frequency range, wherein the predefined frequency range of each of the sub-filters BQ_1, BQ_2, . . . , BQ_N at least partially overlaps with the predefined frequency range of at least one other sub-filter of the set of sub-filters. For example, the fine filter FF_F is formed of peak and/or notch stages, each represented by a single biquad or second order IIR filter, which e.g. are set to a last known good state. The set of sub-filters may comprise between six and twelve sub-filters, e.g. between eight and ten sub-filters. An effective overall frequency range of the fine filter FF_F may be from 80 Hz to 2000 Hz, e.g. from 80 Hz to 1000 Hz.

Figure 7:
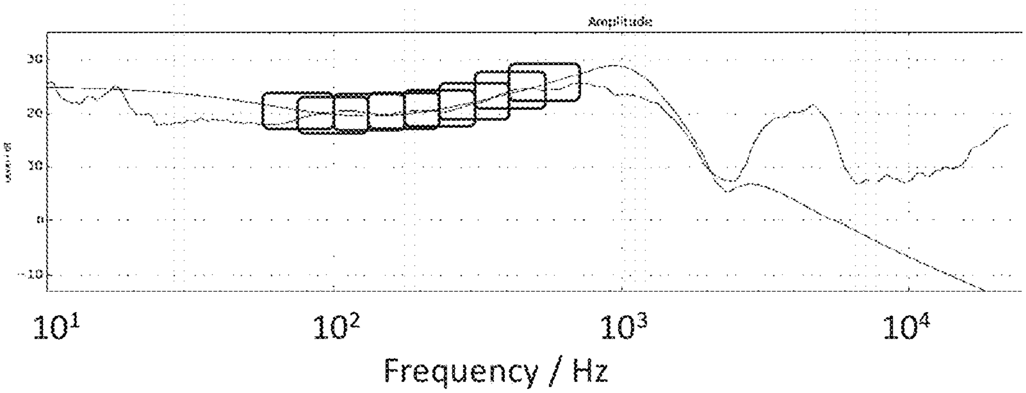
FIG. 7 shows an example frequency diagram with several frequency ranges of sub-filters according to the improved concept.

Referring now to FIG. 7, an overall frequency range of an example implementation of a fine filter FF_F with eight sub-filters is shown, formed by the single predefined frequency ranges of each of the sub-filters marked by a black box. It can be seen that in this example there is a 50% overlap of each sub-filter with a neighboring sub-filter with respect to the frequency range. However, a smaller or greater overlap is still possible.

Referring back to FIG. 2, the noise control processor SCP not only performs an adaptation of the coarse filter parameters of the coarse filter FF_C based on the error signal but also, e.g. subsequently, of the fine filter FF_F.

In particular, the noise control processor performs a limited adaptation of fine filter parameters of each of the sub-filters BQ_1, BQ_2, . . . , BQ_N based on the error signal. Limits of the limited adaptation comprise the predefined frequency ranges of the sub-filters and at least one of gain limit and a Q factor limit. For example, the sub-filters are implemented with peak and/or notch stages which are limited for example to have a maximum gain of +/−1 dB. This approximately results in a maximum gain factor of 1.26 and a minimum gain factor of 0.79. A Q factor may be limited to between 0.1 and 2, for example. A center frequency of each sub-filter may be limited to the predefined frequency range, for example. Therefore adaptation of the fine filter FF_F can either happen conventionally, for example with a filtered-u LMS algorithm to adapt the IIR coefficients with a check and limit on the resultant response of each sub-filter, or the LMS loop can adapt poles and zeros, again with a check and limit on the poles and zeros or the resultant response, or the LMS loop can adapt the fine filter parameters, i.e. gain, Q factor and frequency of each sub-filter within a set range for a predefined topology.

Setting limits on the gain, Q factor and frequency range, along with the fine topology and sub-filter shape, i.e. peak/notch, removes a substantial amount of redundancy in adaptation process, thereby reducing the risk of false nulls and/or slow adaptation. In contrast, a conventional adaptive filter would adapt coefficients without such a constrained topology such that each coefficient could represent a pole or zero in the entire complex space, thereby being less protected against instability issues.

In another embodiment the arrangement of sub-filters is the same, but the noise control processor SCP adapts the coefficient of each of the adaptive sub-filters, in particular separately, while placing equivalent constraints upon them for gain, Q factor, center frequency and shape.

This will be described in greater detail in the following. For example, given a desired gain factor in dB dBgain for a respective sub-filter, a center frequency $f_0$ and a Q factor Q, filter coefficients of an associated second order IIR filter can be calculated, with $F_s$ being the sampling frequency and A and alpha being intermediate parameters. $\omega_0$ is the normalized center frequency.

$$A = \sqrt{10^{\frac{dBgain}{20}}} = 10^{\frac{dBgain}{40}},\ \text{alpha} = \frac{\sin(\omega_0)}{2 \cdot Q},\ \omega_0 = 2 \cdot \pi \cdot \frac{f_0}{F_S}.$$

Based on the above equations, the filter function of each sub-filter can be represented in the Laplace domain as $$H(s) = \frac{s^2 + s \cdot \left(\frac{A}{Q}\right) + 1}{s^2 + \frac{s}{A \cdot Q} + 1}$$

or alternatively in the Z-domain as $$H(z) = \frac{b_0 + b_1 \cdot z^{-1} + b_2 \cdot z^{-2}}{a_0 + a_1 \cdot z^{-1} + a_2 \cdot z^{-2}}$$

with the following parameters $$b_0 = 1 + \text{alpha} \cdot A$$

$$b_1 = -2 \cdot \cos(\omega_0)$$

$$b_2 = 1 - \text{alpha} \cdot A$$

$$a_0 = 1 + \frac{\text{alpha}}{A}$$

$$a_1 = -2 \cdot \cos(\omega_0)$$

$$a_2 = 1 - \frac{\text{alpha}}{A}.$$

Using this calculation approach the resulting filter shape will produce a peak if gains are >1 and a notch if gains are <1. Therefore, adapting the gain will inherently select a peak or notch filter. It should be apparent to the skilled reader that also a normalized approach with only five filter coefficients for each sub-filter can be derived from the explanations above. Constraining the sub filters to one shape ensures that each sub-filter itself will be stable. Alternatively, constraints placed directly on the poles and zeros or even the coefficients could also ensure a particular filter shape or that each sub-filter is stable.

Figure 8:
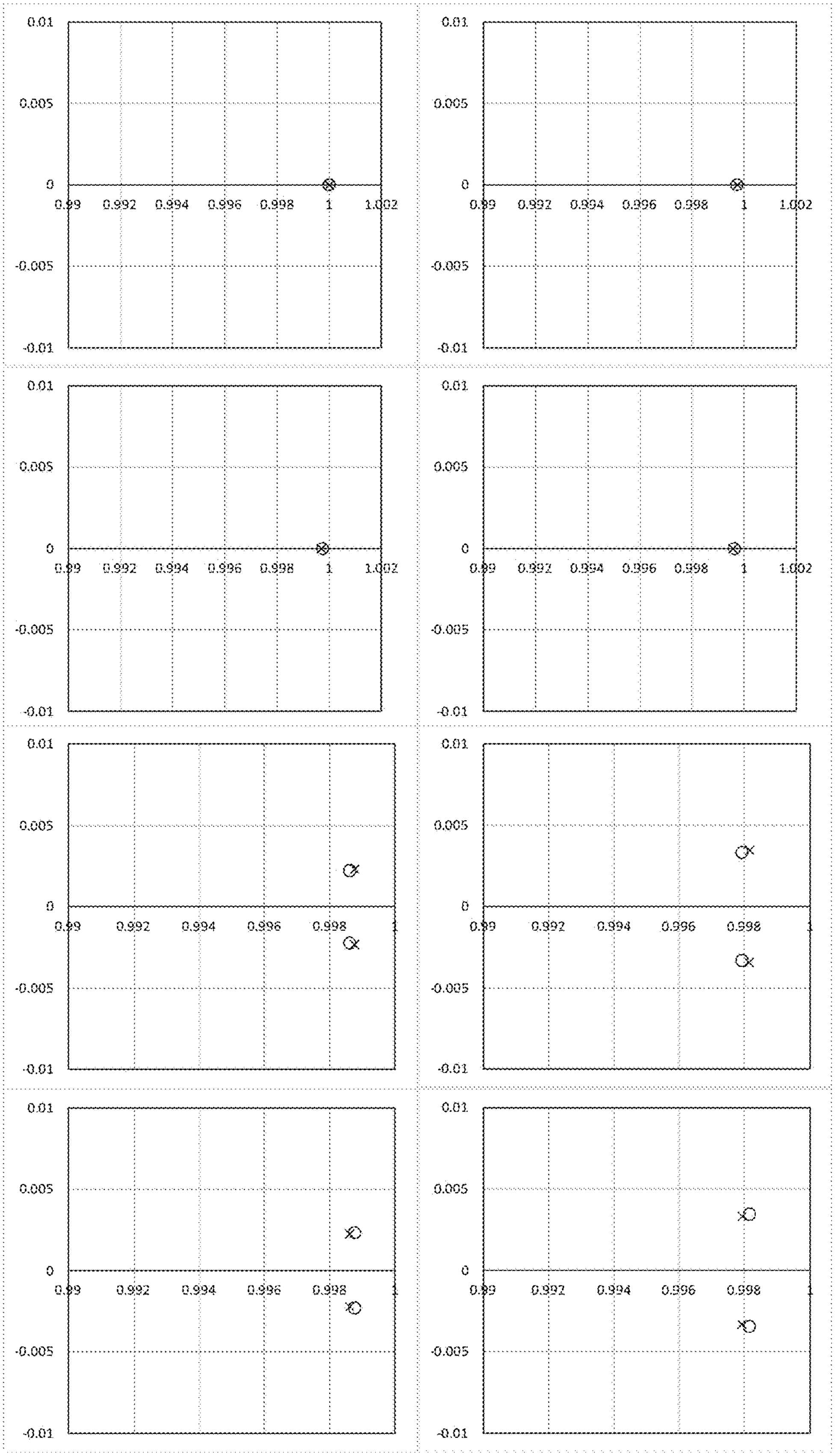
FIG. 8 shows several example zero/pole diagrams.

Referring now to FIG. 8, imposing limits to the adaptive fine filter, notably its shape, gain range, Q factor range and frequency range substantially restricts the possible pole and zero positions to a very small range. A peak/notch filter stage with a minimum and maximum gain, Q factor and frequency can only have poles and zeros in a very small range. FIG. 8 shows the maximum range for pole and zero locations with these constraints. As there are 3 variables (gain, Q and frequency), there are $2^3$ extreme scenarios. As can be seen in FIG. 8, all of these lie within a very small area of the complex plane.

It can therefore be seen that both limiting an adaptive process to separately adapt a coarse filter FF_C and a fine filter FF_F and further limiting the fine filter FF_F as described substantially reduces the allowed variation in poles and zeros, making adaption run substantially faster and ensuring stability. Conventional adaptive algorithms adapt the coefficients and therefore need additional processes to ensure stability. Furthermore they can place a coefficient over a much wider range. Both of these result in slow adaption, and more importantly risk letting the adaption fall into a false null.

Figure 9:
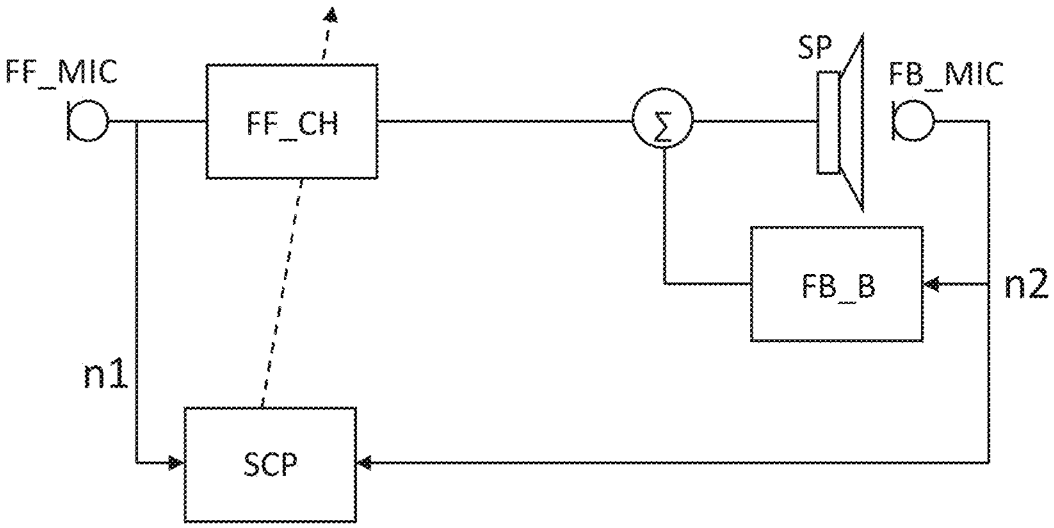
FIG. 9 shows a block diagram of a further example adaptive ANC system.

Referring now to FIG. 9, a block diagram of a further example adaptive ANC system is shown, which is based on the implementation shown in FIG. 2. In particular, in addition to the feedforward path with the filter chain FF_CH also an FB ANC is implemented employing a feedback noise filter FB_B coupling the error microphone FB_MIC to the speaker SP. Such a hybrid ANC approach in conjunction with the adaptive filter chain FF_CH may achieve an ANC performance of about 60 dB.

The invention claimed is:

1. A noise cancellation system for an ear-mountable playback device having a speaker, a feedforward microphone configured to predominantly sense ambient sound and an error microphone configured to sense ambient sound and sound being output from the speaker, the noise cancellation system comprising a filter chain for coupling the feedforward microphone to the speaker, the filter chain comprising a series connection or parallel connection of a coarse filter and a fine filter; and a noise control processor;

wherein the fine filter is formed of a set of sub-filters;

each of the sub-filters has a predefined frequency range;

the predefined frequency range of each of the sub-filters together forms an effective overall frequency range of the fine filter; and the noise control processor is configured to calculate an error signal based on a first noise signal sensed by the feedforward microphone and on a second noise signal sensed by the error microphone;

perform an adaptation of coarse filter parameters of the coarse filter based on the error signal; and perform a limited adaptation of fine filter parameters of each of the sub-filters based on the error signal, wherein limits of the limited adaptation comprise the predefined frequency ranges of the sub-filters and at least one of a gain limit and a Q factor limit.

2. The noise cancellation system according to claim 1, wherein the predefined frequency range of each of the sub-filters is adjacent to or at least partially overlap with the predefined frequency range of at least one other sub-filter of the set of sub-filters.

3. The noise cancellation system according to claim 1, wherein the set of sub-filters comprises between 6 and 12 sub-filters, in particular between 8 and 10 sub-filters.

4. The noise cancellation system according to claim 1, wherein the effective overall frequency range of the fine filter is from 80 Hz to 2000 Hz, in particular from 80 Hz to 1000 Hz.

5. The noise cancellation system according to claim 1, wherein each sub-filter is one of a peak filter and a notch filter.

6. The noise cancellation system according to claim 1, wherein each sub-filter is a minimum-phase filter.

7. The noise cancellation system according to claim 1, wherein the limited adaptation of the sub-filters is based on an error minimization algorithm, in particular a least-mean-squares, LMS, algorithm.

8. The noise cancellation system according to claim 1, wherein the limited adaptation of the sub-filters comprises an adaptation of a gain, a center frequency and a Q factor of at least one of the sub-filters.

9. The noise cancellation system according to claim 1, wherein the limited adaptation of the sub-filters comprises directly adapting the fine filter parameters of at least one of the sub-filters and checking the limits of the limited adaptation for the adapted fine filter parameters.

10. The noise cancellation system according to claim 1, wherein the noise control processor is configured to perform the coarse adaptation in advance of or at a different adaptation rate to the limited adaptation.

11. The noise cancellation system according to claim 1, wherein the noise control processor is configured to perform the coarse adaptation by adapting a gain factor and/or a cut-off frequency of the coarse filter.

12. The noise cancellation system according to claim 1, further comprising a feedback noise filter coupling the error microphone to the speaker.

13. An ear-mountable playback device, in particular headphone (HP) or handset, comprising a noise cancellation system according to claim 1, the speaker, the feedforward microphone and the error microphone located in proximity to the speaker.

14. An audio player comprising a noise cancellation system according to claim 1.

15. The noise cancellation system according to claim 1, wherein the gain limit limits a gain range of the respective sub-filter, and the Q factor limit limits a Q factor range of the respective sub-filter.

16. A signal processing method for an ear-mountable playback device having a speaker, a feedforward microphone configured to predominantly sense ambient sound and an error microphone configured to sense ambient sound and sound being output from the speaker, wherein the feedforward microphone is coupled to the speaker via a filter chain, the filter chain comprising a series connection or parallel connection of a coarse filter and a fine filter, wherein the fine filter is formed of a set of sub-filters, each of the sub-filters has a predefined frequency range, and the predefined frequency range of each of the sub-filters together forms an effective overall frequency range of the fine filter, the method comprising calculating an error signal based on a first noise signal sensed by the feedforward microphone and on a second noise signal sensed by the error microphone;

performing an adaptation of coarse filter parameters of the coarse filter based on the error signal; and performing a limited adaptation of fine filter parameters of each of the sub-filters based on the error signal, wherein limits of the limited adaptation comprise the predefined frequency ranges of the sub-filters and at least one of a gain limit and a Q factor limit.

17. The method according to claim 16, wherein the gain limit limits a gain range of the respective sub-filter, and the Q factor limit limits a Q factor range of the respective sub-filter.

* * * * *